United States Patent
Dinc et al.

(10) Patent No.: US 7,603,310 B2
(45) Date of Patent: Oct. 13, 2009

(54) PARALLELIZATION COMMAND DRIVEN DATA HANDLING

(75) Inventors: Mehtap Dinc, Frankfurt am Main (DE); Tobias Sprohnle, Frankfurt am Main (DE)

(73) Assignee: Deutsche Boerse AG, Frankfurt am Main (DE)

( * ) Notice: Subject to any disclaimer, the term of this patent is extended or adjusted under 35 U.S.C. 154(b) by 297 days.

(21) Appl. No.: 11/432,756

(22) Filed: May 11, 2006

(65) Prior Publication Data

US 2007/0198396 A1    Aug. 23, 2007

(51) Int. Cl.
*G06Q 40/00*    (2006.01)
(52) U.S. Cl. .......................... 705/37; 707/101; 707/205
(58) Field of Classification Search ................. 707/101, 707/103, 250; 341/81
See application file for complete search history.

(56) References Cited

U.S. PATENT DOCUMENTS

| | | | | |
|---|---|---|---|---|
| 5,649,135 | A * | 7/1997 | Pechanek et al. | 712/200 |
| 6,237,021 | B1 * | 5/2001 | Drummond | 709/201 |
| 6,604,166 | B1 * | 8/2003 | Jana et al. | 711/5 |
| 6,898,691 | B2 * | 5/2005 | Blomgren et al. | 712/10 |
| 2003/0115125 | A1 * | 6/2003 | Lee et al. | 705/36 |
| 2005/0044029 | A1 * | 2/2005 | Griffin et al. | 705/36 |
| 2005/0108128 | A1 * | 5/2005 | Kastel et al. | 705/35 |
| 2005/0144104 | A1 * | 6/2005 | Kastel | 705/35 |

OTHER PUBLICATIONS

At Lehman Brothers, H-P Clusters Quietly supports parallel processin for Derivative Applications: May 16, 1994; Trading Systems Tecnology, v 7 N22.*

* cited by examiner

*Primary Examiner*—James P Trammell
*Assistant Examiner*—Mary Gregg
(74) *Attorney, Agent, or Firm*—Marc S. Kaufman; Nixon Peabody, LLP

(57) ABSTRACT

A data processing system and method is provided for managing futures contracts that are based on baskets of credit default swaps as underlyings. A data storage stores data identifying each credit default swap of at least two baskets, and repetitively updated values for credit default swaps of the baskets. A parallelization command is received which indicates at least one credit default swap from a first basket, wherein the credit default swap is a credit default swap not having suffered a credit event. Further, second basket data is generated in response to a received parallelization command. The data storage stores repetitively updated values for credit default swaps of the second basket and continues storing repetitively updated values for credit default swaps of the first basket. In general, a data processing system and method is provided for managing bundles of constructs that may individually fail.

38 Claims, 6 Drawing Sheets

| 210 | 220 | | | | | 200 |
|---|---|---|---|---|---|---|
| c-id1 | v1-1 | v1-2 | v1-3 | ... | v1-M | |
| c-id2 | v2-1 | v2-2 | v2-3 | ... | v2-M | |
| c-id3 | v3-1 | v3-2 | v3-3 | ... | v3-M | |
| c-id4 | v4-1 | v4-2 | v4-3 | ... | v4-M | |
| c-id5 | v5-1 | v5-2 | v5-3 | ... | v5-M | |
| ... | ... | ... | ... | ... | ... | |
| | | | | | | |
| ... | ... | ... | ... | ... | ... | |
| c-idN | vN-1 | vN-2 | vN-3 | ... | vN-M | |

FIG. 2

| 300 | | | | | |
|---|---|---|---|---|---|
| c-id1 | v1-1 | v1-2 | v1-3 | ... | v1-N |
| c-id2 | v2-1 | v2-2 | v2-3 | ... | v2-N |
| c-id3 | v3-1 | v3-2 | v3-3 | ... | v3-N |
| c-id4 | v4-1 | v4-2 | v4-3 | ... | v4-N |
| c-id5 | v5-1 | v5-2 | v5-3 | ... | v5-N |
| ... | ... | ... | ... | ... | ... |
| ... | ... | ... | ... | ... | ... |
| c-idQ-1 | vQ-1-1 | vQ-1-2 | vQ-1-3 | ... | vQ-1-M |
| c-idQ | vQ-1 | vQ-2 | vQ-3 | ... | vQ-M |
| c-idQ+1 | vQ+1-1 | vQ+1-2 | vQ+1-3 | ... | vQ+1-M |
| ... | ... | ... | ... | ... | ... |
| ... | ... | ... | ... | ... | ... |
| c-idN | vN-1 | vN-2 | vN-3 | ... | vN-M |

| 310 | | | | | |
|---|---|---|---|---|---|
| c-id1 | v1-1 | v1-2 | v1-3 | ... | v1-N |
| c-id2 | v2-1 | v2-2 | v2-3 | ... | v2-N |
| c-id3 | v3-1 | v3-2 | v3-3 | ... | v3-N |
| c-id4 | v4-1 | v4-2 | v4-3 | ... | v4-N |
| c-id5 | v5-1 | v5-2 | v5-3 | ... | v5-N |
| ... | ... | ... | ... | ... | ... |
| ... | ... | ... | ... | ... | ... |
| c-idQ-1 | vQ-1-1 | vQ-1-2 | vQ-1-3 | ... | vQ-1-M |
| c-idQ+1 | vQ+1-1 | vQ+1-2 | vQ+1-3 | ... | vQ+1-M |
| ... | ... | ... | ... | ... | ... |
| ... | ... | ... | ... | ... | ... |
| c-idN | vN-1 | vN-2 | vN-3 | ... | vN-M |

FIG. 3

PARALLELIZATION COMMAND DRIVEN DATA HANDLING

BACKGROUND OF THE INVENTION

1. Field of the Invention

The invention generally relates to data processing systems and methods, and more particularly to systems and methods for managing futures contracts that are based on baskets of credit default swaps as underlyings, and for managing bundles of constructs that may individually fail.

2. Description of the Related Art

Many techniques exist where a bundle of constructs is used that may individually fail. Constructs may be hardware arrangements in computer systems or other automated systems, or may be software routines. It is further well known in the art that even more abstract constructs exist such as a conditional relationship between physical or non-physical entities.

Any such construct may fail, in the sense that the task or function assigned to that construct is not (completely) fulfilled. For instance, a hardware component may break, a software routine may dysfunction or even stop to be performed, or a condition can lead to negative results or can be rendered void.

Another field where such techniques can be applied to is the valuation of futures contracts that are based on a basket of credit default swaps as underlyings. Credit default swaps are the most commonly traded credit derivatives. A credit default swap is a contract where one party (the "protection seller") receives a premium from another party (the "protection buyer") for assuming the credit risk of a specified obligation. In return for this premium, the protection buyer will receive a payment from the protection seller upon the occurrence of a credit event.

US 2005/0108128 A1 describes a technique for repetitively determining a resource amount for counterbalancing the transfer of a failure risk pertaining to a bundle of constructs that may individually fail. A data storage is provided for storing reference values of the bundle of constructs for distinct individual time instances during the resource amount determination. The reference values indicate a value of a respective reference construct or a value of a reference bundle of constructs. There is further provided a calculation unit connected to the data storage for calculating a value of the resource amount for an individual time instance based on the reference values.

Generally considering bundles of constructs, any failing construct may be separated from the bundle. For instance, a failing hardware component may be separated from other hardware elements, and a failing software routine may be separated in the sense that the remaining software continues to work. In the example of a basket of credit default swaps, the credit default swap having failed may be removed from the basket.

US 2005/0108145 A1 describes a technique for managing bundles of constructs that may individually fail. Each bundle has a repetitively updated resource amount for counterbalancing a transfer of a failure risk pertaining to the respective bundle. Construct data is stored and a value of the resource amount is calculated for an individual time instance based on the construct data. It is determined whether a construct of a first bundle has failed. If not, a value of a resource amount for the first bundle is calculated, but if a construct has failed, a second bundle is generated that includes all constructs of the first bundle except for the construct having failed, and a value of a resource amount for the second bundle is calculated. Furthermore when a construct of the first bundle has failed, a value of a resource amount for the failed construct is calculated, while the first bundle is disregarded.

US 2005/0144104 A1 describes a technique for valuing a bundle of constructs that may individually fail, in case of a separation event causing the bundle of constructs to separate a failing construct from the bundle. A present value determination unit applies a predefined model to determine a present value of the bundle of constructs after having separated the failing construct from the bundle. Further, a static value determination unit determines a static value by reducing a static base number each time a separation event occurs. Furthermore, a calculation unit calculates a value of the bundle of constructs based on the determined present value and the determined static value, wherein a sum of the determined present value and the determined static value is calculated.

While the conventional techniques provide advantageous approaches for dealing with bundles of constructs where individual constructs fail, it is nevertheless sometimes found to be detrimental that such failure events occur in bundles at all. This is because the overall stability of a computer system and data handling environment dealing with such bundles of constructs may be influenced. For instance, if a failing hardware component is to be separated from other hardware elements, this may require shutting down the hardware so that the entire system is dysfunctional for a given time interval. Similarly, if a software routine is failing and needs to be separated, it may be necessary to stop certain routines from being functioning so that the system goes out of service until the separation work is done. In the example of basket of credit default swaps, removing a failing credit default swap from a basket may likewise lead to temporary data handling instability situations, although removing failing constructs from bundles generally increases reliability. However, the act of doing the separation work may lead to instability situations with respect to the data handling and may reduce, for a given time, reliability.

SUMMARY OF THE INVENTION

Embodiments are provided for managing bundles of constructs that may individually fail, allowing to avoid instability situations as described above, by providing an improved data handling technique.

In one embodiment, there is provided a data processing system for managing futures contracts that are based on baskets of credit default swaps as underlyings. The system comprises a data storage configured to store data identifying each credit default swap of at least two baskets, and store repetitively updated values for credit default swaps of the at least two baskets. The system further comprises a command input unit configured to receive a parallelization command indicating at least one credit default swap from a first basket identified by data stored in the data storage, wherein the at least one credit default swap is a credit default swap not having suffered a credit event. Further, the system comprises a data generator configured to generate, in response to a received parallelization command, data identifying a second basket of credit default swaps having all credit default swaps of the first basket except for the at least one credit default swap, and store the generated data in the data storage. The data storage is configured to store repetitively updated values for credit default swaps of the second basket and continue storing repetitively updated values for credit default swaps of the first basket.

According to another embodiment, in a data processing system that has a data storage storing data identifying each credit default swap of at least two baskets of credit default swaps, and storing repetitively updated values for credit default swaps of the at least two baskets, a method is provided for managing futures contracts that are based on baskets of credit default swaps as underlyings. The method comprises receiving a parallelization command indicating at least one credit default swap from a first basket identified by data stored in the data storage. The at least one credit default swap is a credit default swap not having suffered a credit event. The method further comprises generating, in response to a received parallelization command, data identifying a second basket of credit default swaps having all credit default swaps of the first basket except for the at least one credit default swap, and storing the generated data in the data storage. Further, the method comprises repetitively updating values for credit default swaps of the second basket while continuing storing repetitively updated values for credit default swaps of the first basket.

In another embodiment, a computer readable storage medium stores instructions that, when executed by a processor in a data processing system having a data storage storing data identifying each credit default swap of at least two baskets of credit default swaps and storing repetitively updated values for credit default swaps of the at least two baskets, cause said processor to manage futures contracts that are based on baskets of credit default swaps as underlyings by performing the acts of receiving a parallelization command indicating at least one credit default swap from a first basket identified by data stored in the data storage, where the at least one credit default swap being a credit default swap not having suffered a credit event, generating, in response to a received parallelization command, data identifying a second basket of credit default swaps having all credit default swaps of the first basket except for the at least one credit default swap, storing the generated data in the data storage, and repetitively updating values for credit default swaps of the second basket while continuing storing repetitively updated values for credit default swaps of the first basket.

In yet another embodiment, a data processing system is provided for managing bundles of constructs that may individually fail. The data processing system comprises a data storage for storing data identifying each construct of at least two bundles of constructs, and storing repetitively updated values for constructs of the at least two bundles. The data processing system further comprises command input means for receiving a parallelization command indicating at least one construct from a first bundle identified by data stored in the data storage, where the at least one construct is a construct not having failed. The data processing system further comprises a data generator for generating, in response to a received parallelization command, data identifying a second bundle of constructs that has all constructs of the first bundle except for the at least one construct, and storing the generated data in the data storage. The data storage is configured to store repetitively updated values for constructs of the second bundle and continue storing repetitively updated values for constructs of the first bundle.

In still a further embodiment, there is provided a data processing method for managing bundles or constructs that may individually fail, in a computer system that has a data storage for storing data identifying each construct of at least two bundles of constructs and storing repetitively updated values for constructs of the at least two bundles. The method comprises receiving a parallelization command indicating at least one construct from a first bundle identified by data stored in the data storage, where the at least one construct is a construct not having failed. The method further comprises generating, in response to the parallelization command, data identifying a second bundle of constructs that has all constructs of the first bundle except for the at least one construct. Furthermore, the method comprises storing the generated data in the data storage and repetitively updating values in the data storage for constructs of the second bundle while continuing repetitively updating values for constructs of the first bundle.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein:

FIG. 2 illustrates an embodiment of storing data for a bundle of constructs;

FIG. 3 illustrates an embodiment showing parallel data handling after receipt of a parallelization command;

DETAILED DESCRIPTION OF THE INVENTION

The illustrative embodiments of the present invention will be described with reference to the figure drawings wherein like elements and structures are indicated by like reference numbers. Further reference is made to the glossary of terms at the end of the present description.

Figure 1:
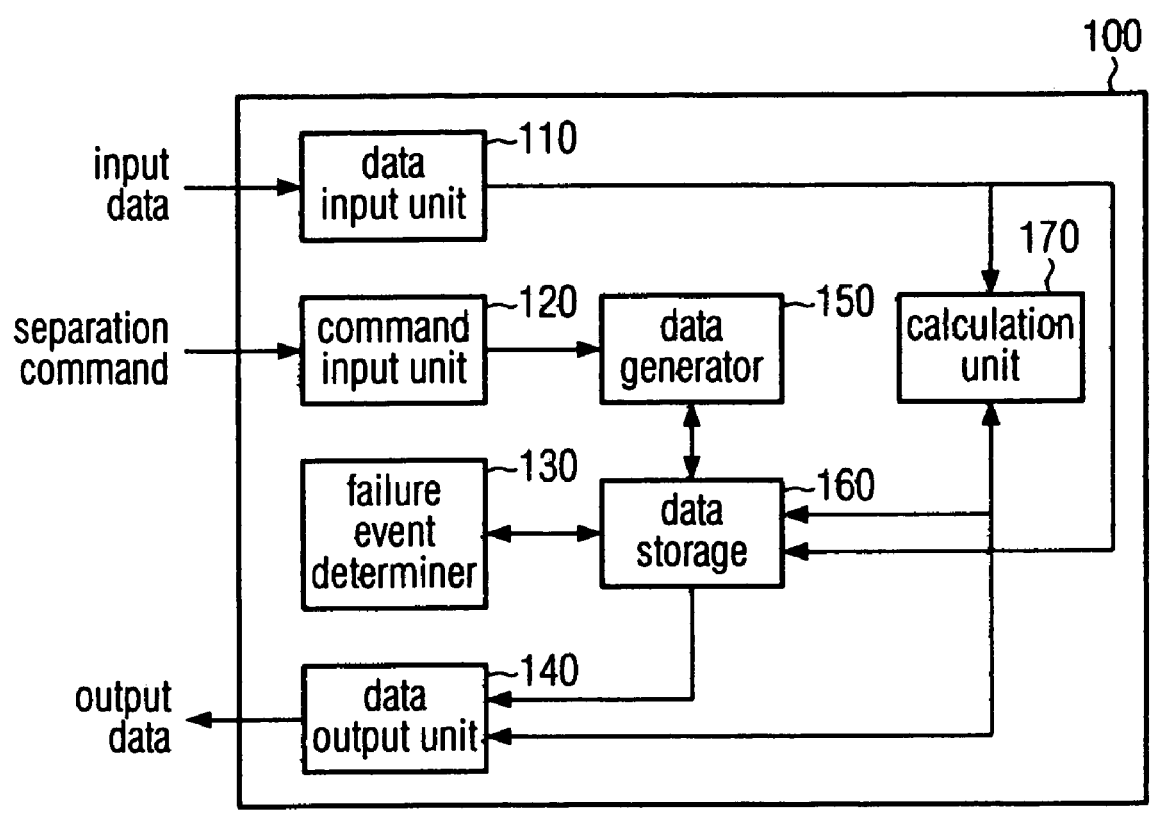
FIG. 1 is a block diagram illustrating a data processing system according to an embodiment.

FIG. 1 is a block diagram illustrating the components of a data processing system for managing bundles of constructs that may individually fail, according to an embodiment. As apparent from the figure, the data processing system 100 comprises a data input unit 110 that receives input data, and a data output unit 140.

The input data may be data of any kind having repetitively updated values for constructs in bundles. For instance, in the example of a bundle of hardware constructs, the values may indicate a degree of functionality, a degree of involvement to processes of certain tasks, a measurement value indicating a processor load, the amount of memory used, or the like. In a bundle of software routines, the repetitively updated values may be similar or the same. Further, these values could indicate how often a certain routine has been run or what is the number, kind or volume of command options received when initiating a software routine. Further, the values could indicate a hierarchy level of instantiated objects. In the example of a basket of credit default swaps, the repetitively updated values may be swap rates, maturities, credit spreads, or the like. In addition, in any embodiment, the repetitively updated values may include weights of constructs indicating a degree of participation of a given construct in the respective bundle.

The data output by the data output unit 140 may be any data generated on the basis of the input data and other data sources.

In particular, the output data may also include the input data or parts thereof, and may further include valuation results such as the value of an extra resource amount.

In general, when operating a bundle of constructs that may individually fail, the overall failure risk may depend on the individual failure probabilities. The failure risk may also change with the time. In this case, it is sometimes found to be detrimental that failure events are not exactly predictable. For this reason, the failure risk pertaining to a bundle of constructs may be transferred to an entity that then assumes the overall failure risk. For instance, a hardware controller or a software program may assume the risk that one or more computer hardware or software constructs fail, by stepping into the functions of these constructs in case of a failure.

To compensate or counterbalance this transfer of a failure risk, the risk assuming entity may receive the extra resource amount mentioned above. Resources may for instance be processor access times, memory capacity, prioritization over other components in the handling of tasks, etc.

Further, such bundles of constructs may be valued by determining a value that is somehow descriptive for the bundle or one or more of its properties. Taking the example of a bundle of hardware constructs, the bundle may be valued to calculate a value indicating a degree of functionality, completeness, utility or usability. The value may also indicate any other property of the hardware arrangement such as an overall response time, a data processing capacity, or the like. Taking the example of a bundle of software routines, the value may be similar in that it describes a degree of errorlessness, processing speed, or the like. In the example of a basket of credit default swaps, the value may be the price of the futures contract.

In the following, embodiments will be described with respect to futures contracts that are based on baskets of credit default swaps as underlyings. It is however noted that generally, a data processing system is provided for managing bundles of constructs that may individually fail.

In the context of credit default swap baskets, a construct may be considered to be a credit default swap, a bundle to be a basket, a failure risk to be the risk of a credit event (or failure event) occurring, and a resource amount to be a premium payment and/or a default payment and/or a present value difference to the present value of the beginning of the lifetime of the futures contract.

Turning now back to FIG. 1, the data processing system 100 has as one of its central units a data storage 160 to store data. The data storage 160 of the embodiment of FIG. 1 is connected to the data input unit 110 to receive and store input data. The data storage 160 is further coupled to the data output unit 140 to provide stored data to the data output unit 140 so as to output this data.

There is further provided a calculation unit 170 which is connected to the data input unit 110, the data output unit 140, and the data storage 160. The calculation unit 170 may receive data from the data input unit 110 to calculate modified values therefrom. For instance, the calculation unit 170 may perform normalization tasks and may average certain of the input data values. The outcome of the calculation unit 170 may be stored in the data storage 160, or may be directly output via the data output unit 140.

It is noted that the calculation unit 170 is further connected to the data storage 160 to retrieve data from the data storage 160 as input to one or more calculation algorithms. For instance, the calculation unit 170 may perform bundle valuation based on this and other data to determine the resource amount mentioned above. The calculated resource amount, which may be a numeric value of the respective bundle of constructs, may be written back to the data storage 160 or may be directly output via the data output unit 140.

As may be seen from FIG. 1, there is further provided a failure event determiner 130 which is connected to the data storage 160. The failure event determiner 130 is an automatic or semi-automatic hardware and/or software unit which determines a failure event and the location or position where it occurred, i.e., the (one or more) construct having failed, and the bundle to which this construct pertains.

The failure event information determined by the failure event determiner 130 is written to the data storage 160 so that it can be read by the calculation unit 170. That is, the calculation unit 170 may take failure events into account for valuing bundles and for other purposes, if necessary. The failure event information stored in the data storage 160 may also be accessible by the data output unit 140 so as to output this information.

It is further apparent from FIG. 1 that the data processing system 100 of the embodiment is configured to receive a further input, namely a parallelization command. The parallelization command is received by a command input unit 120 which triggers data generator 150 to generate data for parallel data handling in addition to the existing data. That is, the data processing system 100 is adapted to generate data in response to a parallelization command. The data generator 150 is connected to the data storage 160 to store the generated data in the storage 160. Further, the data generator 150 can access data storage 160 to retrieve stored data which may form a basis to generate data in response to a parallelization command.

The mode of operation of data generator 150 will now be described in more detail with reference to FIGS. 2 and 3 which depict stored data before and after receiving a parallelization command and performing data generation.

FIG. 2 illustrates a data record stored in the data storage 160 of the data processing system 100 of FIG. 1, for a single bundle. It is noted that the data storage 160 may store similar data records for a (potentially high) number of different bundles.

In the data record 200 of FIG. 2, there is a first array 210 which stores construct identifiers c-id1, c-id2, . . . , c-idN. In the example of FIG. 2, there are N constructs in the bundle, N being an integer number greater than two.

The construct identifiers c-id1 et al. may be numeric, alphanumeric or text identifiers identifying a respective construct. For instance, the identifiers may indicate a serial number and product ID number of a hardware construct, a serial number and built number of a software construct, or the name of a credit default swap.

In another embodiment, the construct identifiers c-id1 et al. may be pointers to memory locations within the data storage 160 or to content external to the data processing system 100. In this embodiment, the locations and content to which the respective pointers point, are descriptive of the respective construct.

As shown in FIG. 2, the data record 200 further includes a second array 220 to store the repetitively updated values mentioned above. In the example of FIG. 2, each of the N constructs in the bundle may store up to M different values v1-1, v1-2, . . . , v1-M, etc. In this example, M may be an integer value of one or more.

It is noted that not all of the N constructs actually require each of the M different values to be present. That is, although the data record 200 of FIG. 2 is shown to have all the values for all the constructs, this may not be necessarily a requirement. For instance, if construct c-id4 requires only values v4-2 and v4-5, the remaining values for this construct may be set to zero, null, nil, void, or to another predefined value, or the respective fields in the data array 220 may be indicated to be dysfunctional. It is further noted that not all of the values v1-1, . . . , vN-M need actually to be repetitively updated. That is, there may be various of these values which are allowed to be static, at least for a given time. It is further noted that while the values in data array 220 are indicated to be repetitively updated, it may be no requirement that the repetition be of any regularity or periodicity.

Turning now to FIG. 3, an example is shown illustrating the result of operating the data generator 150 in response to a parallelization command for construct c-idQ. As can be seen from FIG. 3, data record 300 is a complete data record at the time of receiving the parallelization command, and data record 310 differs from record 300 only in that there is no data present with respect to construct c-idQ.

That is, in response to a parallelization command relating to construct c-idQ, the data generator 150 has generated data identifying a second bundle of constructs having all constructs of the existing bundle except for construct c-idQ. It is noted that data record 310 is generated in addition to data record 300, and not as replacement. That is, a parallelization command actually causes the data processing system 100 to generate an additional data record so that the total number of bundles for which data is stored in the data storage 160, is increased.

While it is only one construct in the example of FIG. 3 which triggers parallelization, it is noted that other embodiments may use parallelization commands which each can cause data generation for more than one construct. For instance, if a parallelization command is received indicating three constructs from a bundle, a second bundle record may be generated which is identical to the existing data record except for the fact that the respective three lines are missing. It is however noted that in another embodiment, multiple (e.g., three) different parallelization commands may be received at different time instances, each leading to generation of a new bundle. In that case, as many new bundles would be generated as parallelization commands are received.

It is further noted that the embodiments may provide for identifying the respective construct or constructs by means of the parallelization command. That is, a parallelization command may include the respective construct identifier(s), for instance, in a header portion. Alternatively, the data processing system 100 may have many distinct input ports, each for an individual construct, so that construct identification by means of a parallelization command can be performed by identifying the respective port rather than by reading data from the command.

In any of the above embodiments, it is noted that the construct or constructs for which a parallelization command is received, has not (yet) failed. That is, unlike the situation in the prior art systems described above, the embodiments perform preparation work prior to a failure event, leading to extra data handling which then, after the point of time of a recovery determination event (see below), allows to proceed in a stable manner, as apparent from FIG. 4.

Figure 4:
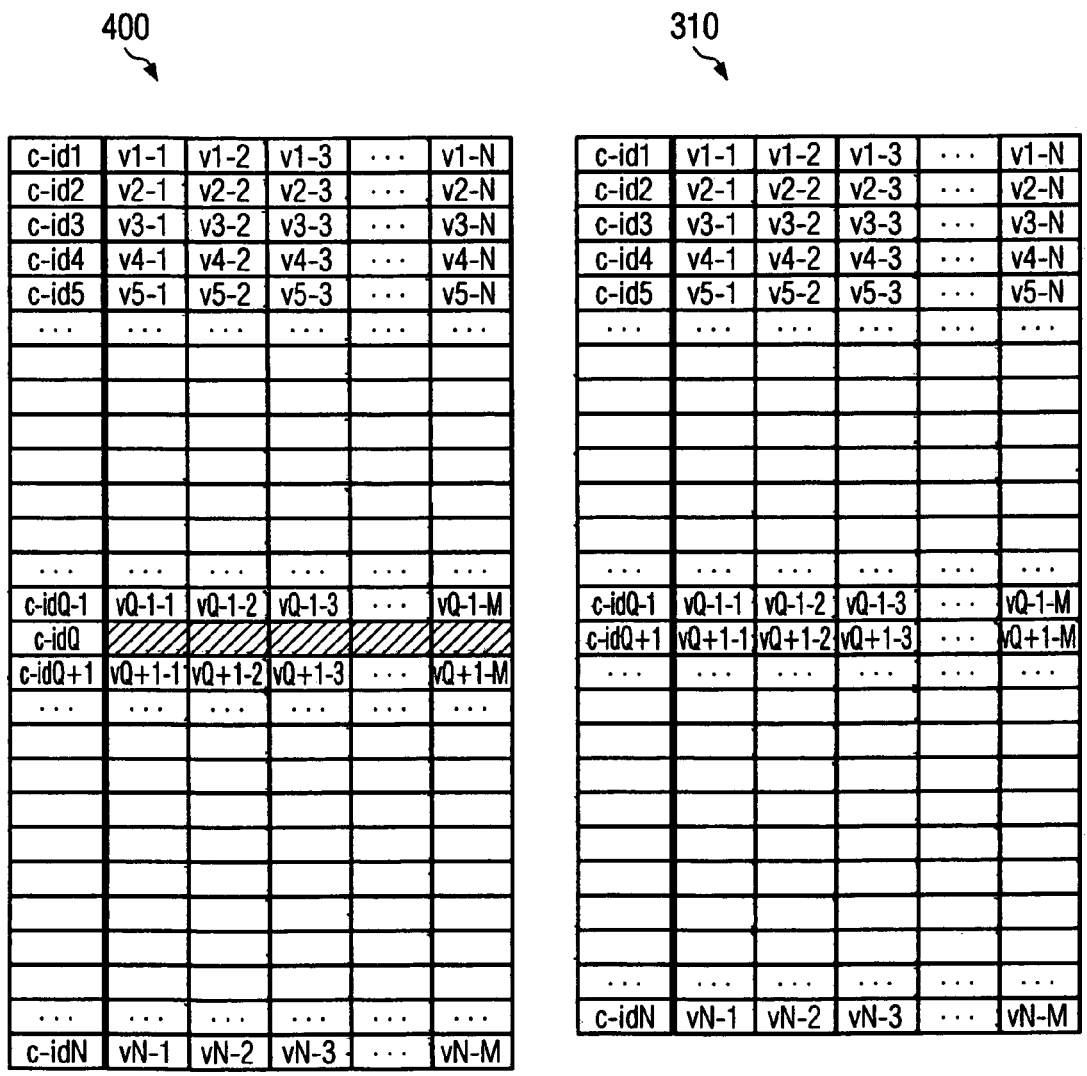
FIG. 4 is based on the embodiment of FIG. 3 and illustrates the data handling in case of a failure event following a parallelization command.

Referring to this figure, the stored data records are depicted based on the embodiment of FIG. 3, but after a failure event. In the embodiment of FIG. 4, the failure event occurred for construct c-idQ, i.e., for the construct for which a parallelization command was previously received. As construct c-idQ has now failed, the respective data record 400 may indicate the respective data to be invalid. It is noted that the generated data record 310 remains totally unaffected since it does not hold any data with respect to the construct now having failed.

In the embodiment of FIG. 4, the data processing in relation to data record 400 may be in line with the principles described in the prior art, particularly that of US 2005/0108145 A1 and US 2005/0144104 A1. It is however noted that the bundle of constructs relating to data record 400 may also be managed in a different manner. Further, any bundles of constructs may be valued and/or managed—in accordance, as an alternative or in addition to what was described above or will be described below—using the techniques described in US 2005/0108128 A1, US 2005/0108145 A1 and US 2005/0144104 A1 the contents of which are herewith incorporated by reference in their entirety. In particular, the calculation method from credit spread into portfolio present value resp. futures price may be done as described in US 2005/0108128 A1.

For instance, in an embodiment, a bundle of constructs may be valued based on a static nominal, a present value of the bundle, and a premium value. The value of the bundle of constructs may then be calculated as a sum of the static nominal, present value and premium value.

Taking the example of a futures contract that is based on a basket of credit default swaps, the futures price may be interpreted as portfolio value. In order to derive the comparable market exposure, the quoted futures price which looks like a bond price may be multiplied with a multiplier. For instance, if the futures price is 100.00 and a multiplier of 10$/0.01 (which is 1,000$/1) is chosen, the portfolio value amounts to $100,000.

The overall portfolio value is then determined by the following three values: portfolio nominal, portfolio present value, and portfolio premium.

The portfolio nominal is a static value that is determined by reducing a static base number each time a separation event occurs, beginning on the day of the failure event. Thus, the static nominal represents the nominal of the survived obligors, hence the exposure. In an embodiment, the static nominal is only affected by defaults which lead to a reduction of that number by the weighting of the defaulted name. For instance, if the static base nominal is 100, and one of the names (e.g. the $57^{th}$) which has a weighting of 1% defaults, the static nominal is reduced by 1, leading to a new static value of 99. Thus, a credit event leads to a nominal reduction of the underlying nominal by the weighting of the defaulted name. Consequently, the static value reflects the nominal reduction of the contract in a credit event, and thus reflects the consequences of a credit event.

The portfolio present value is determined by applying a predefined model after having performed parallelization in view of the name defaulted and beginning on the day of the failure event. Thus, the portfolio present value may be calculated based on standard market pricing models and on survived obligors only. In other words, the present value may be based on the mark to market value of a credit default swap basket with a nominal equal to the portfolio nominal. For instance, if the portfolio experienced a default of a name with a weighting of 1%, the present value is calculated for the reduced portfolio nominal of 99. In an embodiment, the present value may reflect spread changes of the underlying. In this case, the present value fluctuates with credit spread changes, and the implied spread could easily be backed out of the futures price.

Finally, the portfolio premium is a value that is calculated in an accumulative manner on a predefined time basis. For instance, the portfolio premium may be calculated on a daily basis, with weekends and bank holidays being considered accordingly. Again, the premium value is calculated based on survived obligors only and for the construct until failure event day. In an embodiment, the premium is credited/debited for open positions at the end of the day based on the fixed credit spread of the contract. In the embodiment, the premium payment calculation stops at the day of a real credit event (or failure event) which means it does not stop on the day of the parallelization command although these two dates can be the same.

The generation of an extra data record in response to a parallelization command, as illustrated in FIG. 3, may provide a parallel listing in response to a "soft" or "anticipated" event, for instance if a real credit event has not yet occurred but may be anticipated. The parallelization command then causes a new index to be calculated based on a reduced basket. This would then also allow for separately trading two futures contracts, one based on the previous (and still existing) basket, and the other based on the generated basket.

Taking for example a basket of N=125 names and a contract value of €100,000, the contract may be priced as a sum of a static number of 100, a present value change, and a premium which is based on 125 names.

After a parallelization command is received for one of the 125 names, the 125 name contract remains unchanged, and its pricing remains unchanged as well until the failure event day. The 124 name contract may have a contract value of €100,000 and may be priced using a sum of the static number of 99.2, the present value change, and a premium based on 124 names.

In case of a real credit event (which is the failure event day), the 125 name contract as well as the 124 name contract may continue to be tradable. The pricing of the 125 name contract may change to be based on a sum of a static number of 99.2, the present value change, the premium and a 1-recovery rate for the defaulted name. The premium may have one part based on 124 names until the day of the real credit event, and a second part based on 124 names only from the day of the real credit event.

It is noted that the defaulted name may still be part of the 125 name contract, but its value may be reflected in the futures price. It is further noted that the premium component may be based on 124 names only as from this point onwards no future protection for the default name is available and thus no premium has to be paid for it.

The 124 name contract may have a contract value of €100,000 and may continue to be priced as described above, i.e., by a sum of the static number of 99.2, the present value change, and a premium which is based on 124 names.

To summarize, the final settlement price may be determined in case of a credit event based on the following procedure: A formula based settlement is performed using a 125 name fixing as a basis. If no 125 name contract fixing is available, the final settlement price will be determined to be the sum of the fixing of the 124 name contract and a recovery fixing. If no recovery rate fixing is available for the defaulted entity on the expiry of the index contract, there may be a different scenario.

Figure 5:
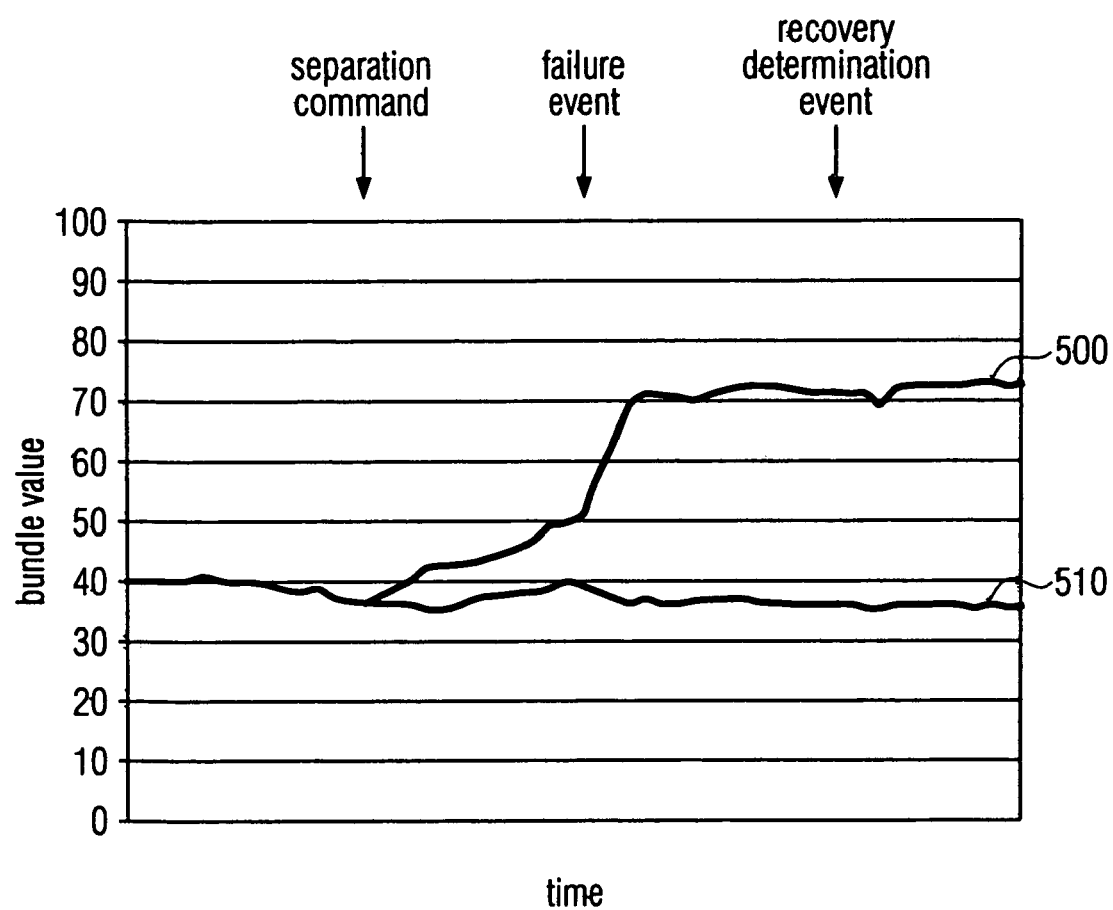
FIG. 5 is a graph illustrating the different bundle variation techniques for the listed bundles in parallel according to an embodiment.

Referring now to FIG. 5, an example is shown for resource amount determination for a bundle of constructs, as time develops, according to an embodiment. As can be seen, up to the time where a parallelization command is received, there exists only one bundle so that the valuation merely leads to one bundle value curve.

At a given time, a parallelization command is received indicating that one of the constructs is assumed to fail in the near future. The parallelization command causes generation of a second bundle which is listed in parallel together with the bundle including the distressed construct. Accordingly, the bundle value curve divides up into two curves 500, 510 where curve 500 is the curve of the previous and still existing bundle while curve 510 indicates the bundle values of the second, generated bundle.

If a certain time later, a real failure event does indeed occur, this event will have no influence on curve 510 since the failing construct is not part of this bundle. However, referring to the "old" bundle, the defaulted construct is disabled (see FIG. 4) which may lead to a change in the respective bundle value. This can be seen in the example of FIG. 5 by having a step in curve 500.

In the example of a basket of credit default swaps, and discussing several scenarios which differ in the respective futures expiry dates, the final settlement price determination may be based on a (N=) 125 name index fixing when the futures contract will expire with no failure event having occurred.

In another scenario where a futures contract expires in a parallel listing phase (i.e. after receipt of a parallelization command) but where no failure event has occurred, the final settlement price determination for the 125 name contract may be based on a 125 name index fixing while the final settlement price determination for the 124 name contract may be based on the 124 name index fixing.

If however, a failure event occurs, the defaulted name is excluded from the premium portion of the futures price and the premium for the 124 name contract continues to be accrued based on a reduced nominal which is reflected through the reduction in the static number.

Discussing now the futures expiry after a failure event, two different scenarios may be distinguished: one where the futures expiry occurs after a recovery determination event (such as a recovery auction), and the other where the future contract expires before the recovery determination event.

In the scenario where the futures contract expires after the failure event and also after a recovery auction, the premium payment is stopped for the defaulted entity at the time the failure event occurs. At the time of the recovery auction, the settlement price for the defaulted entity is defined, and there will be no profit/loss movement for the defaulted entity up until the future expires, since the recovery is fixed. In this scenario, the final settlement price will be, for the 125 name contract, the sum of the 124 fixing and the auction price for the defaulted entity, and for the 124 name contract, simply the 124 fixing.

In a scenario where the futures contract expires after a failure event but before a recovery auction, the premium payment for the defaulted entity may be stopped at the time of the failure event. However, at the time the futures contract expires, no recovery rate fixing might be available. In this case, one embodiment schedules a recovery auction to be held latest on futures expiry, either for over-the-counter and futures markets, or only for futures markets. In another embodiment, the recovery rate may be determined based on a fixed recovery rate or based on other data sources. The final settlement price in this scenario would be similar to that of the above-mentioned scenario, but the 125 name contract price may be the same of the 124 fixing and a price for the defaulted entity determined according to the respective embodiment. In yet another, preferred embodiment, there may be a process where the original contract is only partly cash-settled and the defaulted name is separated and traded until the day of the recovery auction.

To summarize, the embodiments provide for generating extra data records relating to new, previously non-existing bundles of constructs, in response to a parallelization command. The parallelization command is received at a time where no failure event has occurred but where a failure event may be anticipated. The previous bundle and the new bundle exist in parallel so that any valuation of each bundle takes place separately based on the respective repetitively updated construct values, and migration from the old bundle to the new bundle is possible in a smooth and stable manner.

Figure 6:
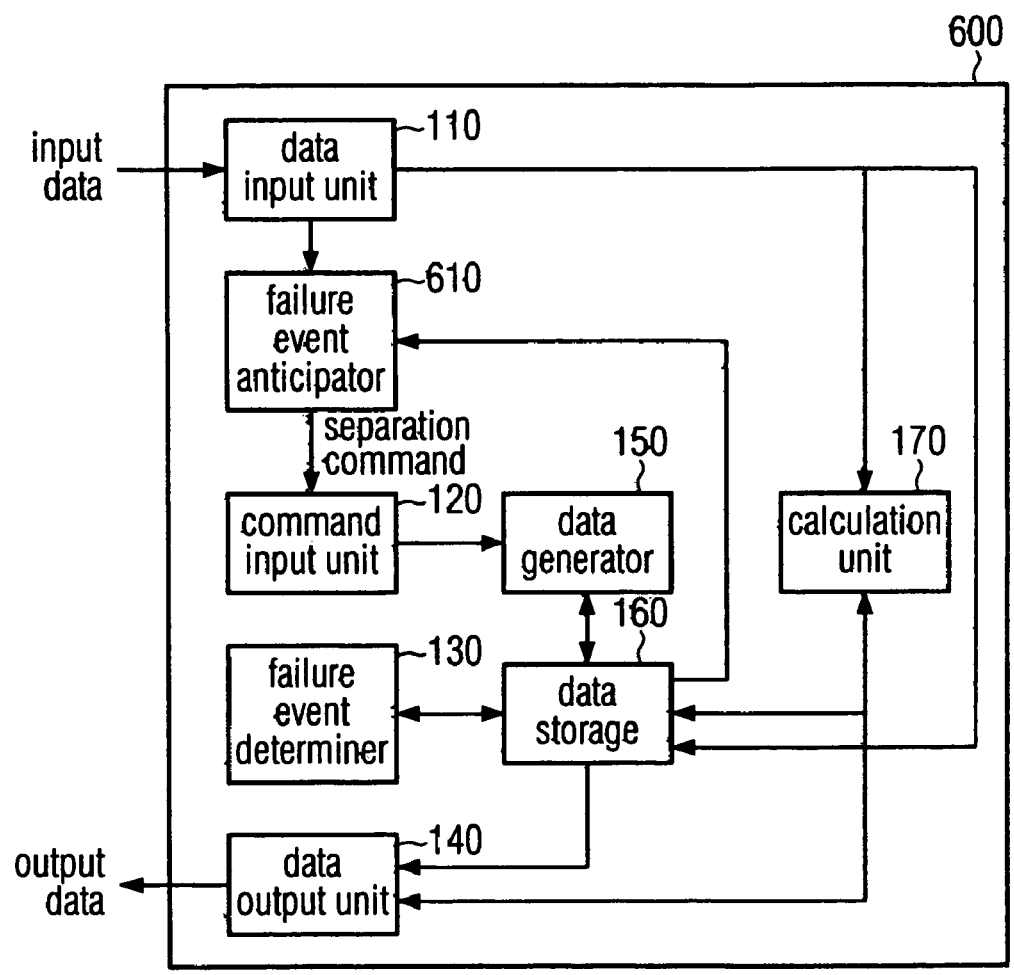
FIG. 6 is a block diagram illustrating a data processing system according to another embodiment.

Referring to FIG. 6, a data processing system 600 is shown which differs from that of the embodiment shown in FIG. 1 by a failure event anticipator 610. The failure event participator 610 is connected to the data input unit 110 and the data storage 160, and its purpose is to generate the parallelization command. The parallelization command is then issued to the command input unit 120.

That is, the embodiment of FIG. 6 may allow for an automated failure event anticipation on the basis of the continuously and repetitively updated input values as well as based on the continuously and repetitively updated construct values for each bundle in the data storage 160. It is noted that the failure event anticipator 610 may base its parallelization command decision on additional sources of information in a further embodiment. It is further noted that the embodiments of FIG. 1 and FIG. 6 may be combined to support various distinct modes of generating and issuing parallelization commands.

In any of the above described embodiments, the anticipated and the real credit event may coincide. In this case, the day of issuing a parallelization command is the day of the (real) failure event.

GLOSSARY OF TERMS

The following glossary of terms may be used to better understand the invention.

A "30/360 daycount basis" assumes that there are 360 days in a year and 30 days in each month.

"ACT/360" is a day count convention used for many bonds and default swaps.

"Arbitrage" is the act of simultaneously buying and selling of very similar financial instruments in different markets in order to profit from short term price differences between those markets.

An "asset swap" is the combination of the purchase of a fixed rate bond together with an interest rate swap where the fixed rates are paid (and the fixed rate is the scheduled coupons of the purchased bond) and floating rates are received.

A "basis point" is 0.01 percent, usually of an interest rate or a credit spread.

A "Binary default swap" is a credit default swap where the amount paid by the protection seller following a credit event is fixed and is not a function of the recovery rate of the reference obligation after the credit event.

"Bootstrapping" is a recursive process by which future interest rates can be calculated from earlier interest rates. For example, bootstrapping may be used to determine the zero coupon rate from a known yield curve for successive points in time.

"Cash settlement" is the process in which traders receive or pay the losses or gains on a futures contract in cash. Cash settlement is an alternative to the physical delivery of the goods specified in the futures contract.

A "clean function" is a bond or default swap valuation which excludes accrued interest. Accrued interest is interest owed but not yet paid for the historic period between the last coupon date and the valuation date.

The "clean price" is the price of a bond or default swap, excluding accrued interest.

A "clearing agent" or a "clearinghouse" is a type of exchange where transactions between brokers are executed.

A "contract specification" is the exact parameters (including pricing models and inputs, if any) of any futures contract.

A "corporate bond" is a debt obligation of a corporate issuer. The investor in the corporate bond bears the risk that the corporate might default on the payment obligation.

A "credit default swap" is a contract where the protection seller agrees to purchase from the protection buyer an obligation issued by a reference entity for its par value after the occurrence of a credit event. In return, the protection buyer agrees to pay a premium to the protection seller until the earlier of the maturity of the credit default swap and the date of a credit event.

A "credit derivative" is a financial instrument that enables the isolation and separate transfer of credit risk. Credit derivatives have credit contingent payoffs that are only triggered following a credit event. For example in a credit default swap, after a credit event, the protection seller buys a defaulted bond from the protection buyer for its par value.

A "credit event" is an event that triggers the credit contingent payment of a credit derivative. Standardized credit events are commonly traded and include: bankruptcy, failure to pay, obligation default, obligation acceleration, repudiation/moratorium and restructuring.

The "credit event announcement time" is the time after the close of trading each day when the exchange formally announces credit events deemed to have occurred.

A "credit spread" is the difference (usually quoted in basis points) between the yield on a reference obligation and the yield on the equivalent risk free debt instruments of the same maturity.

A "counterparty" is one of two parties to an agreement. If two parties agree to something, they are both a counterparty to the agreement, and they may both be collectively referred to as the counterparties to the agreement. The terms agreement and contract may be used synonymously.

A "coupon" is a statement of interest owed that may be detached from a bond and separately redeemed at a specified time.

"Discount factors" are numbers derived from a zero coupon curve that are used to determine the present value of one or more cash flows. Thus, a discount factor $d_i$ is the present value of $1 received in the future at time i.

The "discount rate" is the rate used to calculate the present value of future cash flows. Typically, the discount rate accounts for at least the interest that could be obtained in a relatively risk free investment, such as a Treasury bill.

The "effective date" is the date and time at which parties have previously agreed to cash settle a futures contract.

"Equilibrium zero rates" are zero rates derived from the midpoint between bid and asked quotes for a yield curve.

The "European Interbank Offered Rate" (EURIBOR) is a short term interest rate at which banks are willing to lend funds to other banks in the interbank market. EURIBOR interest rates are determined by a group of banks located in Europe.

An "exchange" is an organization that brings together buyers and sellers of particular assets. Typically, the exchange makes rules that govern participation and trading.

A "failure event" may be any event of severe deterioration of the value of an individual reference construct. If a failure event leads to a separation of a construct out of a bundle, the failure event may be considered to be a separation event.

"Forward interest rates" are the interest rates fixed today on loans to be made at corresponding future dates.

A "future" is a standardized contract that is bought or sold, respectively, for future acceptance or delivery. It is also possible to cash settle futures contracts by reference to the fixing value of the underlying financial instrument on the futures expiry date.

A "future time period" is a date and time that has not yet occurred.

A "futures contract" is an agreement to buy or sell a financial instrument on a future date at a price that is fixed today.

A "futures exchange" is an organization that brings together buyers and sellers of futures contracts.

The "futures price" of an asset is the price of an asset today for delivery in the future.

"To hedge" is to invest in a first asset to reduce the risk associated with a second asset. Generally, the value of the first and second assets are related inversely, so that when the value of the first asset decreases, the value of the second assets increases, and vice versa. A perfect hedge results when the two sides of a hedge move together in exactly the same proportion.

A "hedge ratio" or "delta" is the number of units of an asset needed to hedge one unit of a liability.

The "implied zero curve" is a zero coupon curve derived from a coupon or swap curve.

"Interest rate risk" is the potential monetary gain or loss on a financial instrument if interest rates changed from their current value.

The "International Money Market" (IMM) is the financial futures market within the Chicago Mercantile Exchange.

"ISDA" is the International Swaps and Derivatives Association, the trade organization for the credit derivatives industry.

The "London Interbank Offered Rate" (LIBOR) is a short term interest rate at which banks are willing to lend funds to other banks in the interbank market.

A "long position" is a position which has been purchased for value, as opposed to a position which has been sold.

"Loss given default" ("LGD") is the amount paid by a protection seller to a protection buyer in a credit default swap after a credit event occurs. Loss given default is defined as a loss on a reference debt instrument, usually given as the par value less the recovery rate of the reference debt instrument observed after the credit event in the bond market. In addition, loss given default can be defined to be a binary amount so that a fixed amount is paid out after a credit event regardless of the actual post credit event recovery rate.

"Margin" is the amount of money that an exchange requires as deposit in order for a dealer to maintain an account.

"Margining" is the practice of maintaining a minimum margin with an exchange. For example, if the account of the first dealer has decreased by $10,000 from the previous time period in which margining occurred, the dealer pays the entity that oversees trading $10,000. For most futures contracts, margining occurs daily after the close of trading because the contracts are marked-to-market.

"Marking to market" is the practice of calculating the profits and losses on a contract at the end of each day and settling up between the exchange and the dealers. Most, if not all, futures contracts are marked-to-market. Marking to market is also called daily settlement.

"Maturity" is the date and time at which the obligation represented by a financial instrument terminates. For example, a 10 year bond issued today matures 10 years from today.

The "net preset value" (NPV) of an investment is the sum of the present value of all cash flows resulting from an investment.

"Netting" is the act of offsetting credit exposure between financial institutions.

Netting is also the process by which multiple obligations between parties are offset against one another to reduce (and minimize, if possible) the number of transactions required to fulfill the multiple obligations. For example, if a first dealer owes the second dealer $100, and the third dealer owes the first dealer $100, both obligations are netted by a single payment of $100 from the dealer to the second dealer.

"Over-the-counter" (OTC) is an informal market that does not involve a futures exchange.

"To pay fixed" means to pay a fixed interest rate, usually as part of an interest rate swap.

The "present value" (PV) is the value of a future sum of money today, based on a particular discount rate.

A "protection buyer" is a credit derivative user that wishes to reduce credit risk exposure to a specific reference entity and pays a counterparty to do so.

A "protection seller" is a credit derivative user that is willing to take on additional credit risk of a specific reference entity in return for an appropriate fee.

The "recovery rate" is the proportion of face value of debt that an investor would be able to recover (either through sale of the debt or through the liquidation process) following a credit event.

The "reference entity" is the issuer of the debt obligations referenced in a credit derivative trade.

The "repo rate" is the interest rate applicable to principal amount loaned as a result of a repurchase agreement.

A "repurchase agreement" or "repo" is a short-term loan agreement by which one party sells an asset to another party, but promises to buy back the asset at a specified time.

"Selling short" is the process of making a short sale.

A "separation event" may be any event of some influence on a resource amount update for counterbalancing a transfer of a failure risk pertaining to a bundle of constructs, potentially leading to a decision, when managing bundles of constructs that may individually fail, to separate one or more individual constructs out of one or more of the managed bundles. For example, a separation event corresponds to a serious degradation of the creditworthiness of an obligor. A separation event could be defined to include credit events, and/or adverse changes in credit rating, and/or credit spreads exceeding predefined maximum thresholds. The occurrence of a separation event on an obligor causes the futures contract to separate into two separately traded futures contracts—one based on the bundle of non-separated obligors, and another based on the separated obligor.

A "short sale" is the sale of an asset that an investor does not own. The investor is obligated to buy the same amount of the asset that was sold short at a later date.

"Shorting" is the act of selling an asset which one does not own at the time of sale.

"Spread" refers to an observable market price for the isolated credit risk of a defined obligor expressed in yield basis points (credit spread).

"Survived" refers to names in the index that have not suffered a credit event on or in the time prior to a valuation date.

"Stub calculations" are interest calculations relating to the period of time, either before or after a defined date.

The "three month LIBOR rate" is the LIBOR rate for a three month loan. If a counterparty to an IRS pays floating interest based on the three month LIBOR rate, that counterparty makes an interest payment every three months, the amount of which is determined by multiplying the then current three month LIBOR rate by the notional amount.

"Trading desks" are the place where traders send and receive information and execute trades.

A "transparent" price describes a price derived from standardized terms and a single pricing model that is generally applicable to all circumstances.

A "Treasury" is a debt issued by the U.S. government. "Treasury bills" mature in less than a year, "Treasury notes" mature from one year to under 10 years, and "Treasury bonds" take 10 or more years to mature.

"Treasury accrued interest" is the accrued interest on a Treasury bond for a period of time.

"Values" may be the values of any data, which could be spreads, weights, credit events. Those variables might be fixed parameters for calculation purposes or might change over time. A value could also be a result of a calculation.

"Variation margin" is the payment due to or from an exchange (usually made each trading day) as a result of the change in value of a exchange traded contract.

A "yield" is a profit expressed as a percentage of the investment made to achieve that profit. If a $100 investment pays $106 in a year, the annual yield is 6%.

A "yield curve" is the relationship between future interest rates and time. A graph showing the interest yield of securities displaying the same characteristics as government securities is known as a par coupon yield curve. The U.S. Treasury yield curve is an example of a par coupon yield curve.

The "yield spread" is the difference in yield between two fixed income instruments.

A "zero-coupon bond" does not pay interest at periodic intervals; rather, it is issued at a discount from its par (or face) value and is redeemed at par. For example, a bond that costs $60, pays no interest, but is redeemable for $100 in 20 years, is a zero-coupon bond.

The "zero coupon discount factor" is the discount factor for a zero coupon bond.

The "zero-coupon rate" is the yield on a zero-coupon bond. All coupon bonds has an equivalent zero-coupon rate that is equal to the yield of a zero coupon bond having an NPV equal to the coupon bond.

The "zero-coupon yield curve" or "zero coupon curve" is a graph or relationship of the internal rate of return of zero-coupon bonds over a range of maturities.

"Zero rates" are zero coupon rates, usually derived from a par coupon curve, that are used to determine discount factors.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A data processing system for managing futures contracts that are based on baskets of credit default swaps as underlyings, comprising:
    a data storage configured to store data identifying each credit default swap of at least two baskets, and store repetitively updated values for credit default swaps of said at least two baskets;
    a command input unit configured to receive a parallelization command indicating at least one credit default swap from a first basket identified by data stored in said data storage, said at least one credit default swap being a credit default swap not having suffered a credit event; and
    a data generator configured to generate, in response to a received parallelization command, data identifying a second basket of credit default swaps having all credit default swaps of the first basket except for said at least one credit default swap, and store the generated data in said data storage,
    wherein said data storage is configured to store repetitively updated values for credit default swaps of said second basket and continue storing repetitively updated values for credit default swaps of said first basket.

2. The data processing system of claim 1, further comprising:
    a calculation unit configured to calculate, for each basket of credit default swaps for which the data storage stores repetitively updated values, a futures contract value in accordance with one of several calculation algorithms, said futures contract value being a value of a futures contract having the respective basket of credit default swaps as underlying,
    wherein said calculation unit is configured to calculate the futures contract value for the futures contract of said first basket in the same manner after generation of the data identifying the second basket than before.

3. The data processing system of claim 2, wherein said calculation unit is further configured to calculate the futures contract value for the futures contract of said second basket in accordance with a different calculation algorithm than the futures contract value for the futures contract of said first basket.

4. The data processing system of claim 3, wherein the calculation unit is configured to calculate the futures contract value, in accordance with each of said several calculation algorithms, based on a premium pertaining to the respective basket of credit default swaps,
    wherein the calculation algorithm used to calculate the futures contract value for the futures contract of said second basket makes use of a premium which is reduced with respect to the premium in the calculation algorithm for the futures contract value for the futures contract of the first basket by a premium portion pertaining to said at least one credit default swap.

5. The data processing system of claim 1, further comprising:
    a calculation unit configured to calculate, for each basket of credit default swaps for which the data storage stores repetitively updated values, a futures contract value in accordance with one of several calculation algorithms,
    wherein said calculation unit is further configured to calculate, after a credit default swap in said first basket has suffered a credit event, the futures contract value for the futures contract of said first basket in a different manner than before.

6. The data processing system of claim 5, wherein said calculation unit is further configured to calculate, after a credit default swap in said first basket has suffered a credit event and this credit default swap is a credit default swap for which a parallelization command was received that has caused generation of data identifying said second basket, the futures contract value for the futures contract of said first basket in a different manner than the futures contract value for the futures contract of said second basket.

7. The data processing system of claim 6, wherein the calculation unit is further configured to calculate the futures contract value, in accordance with at least some of said several calculation algorithms, based on a premium pertaining to the respective basket of credit default swaps, wherein the calculation algorithm used to calculate the futures contract value for the futures contract of said first basket makes use, after a parallelization command is received and before a credit default swap indicated by this parallelization command has suffered a credit event, of a premium, and wherein the calculation algorithm used to calculate the futures contract value for the futures contract of said first basket does not make use, after the credit default swap indicated by the parallelization command has suffered a credit event, of the premium.

8. The data processing system of claim 1, further comprising an automated failure event anticipator which issues a parallelization command based upon information about an imminent credit event for a credit default swap in said first basket.

9. In a data processing system having a data storage storing data identifying each credit default swap of at least two baskets of credit default swaps, and storing repetitively updated values for credit default swaps of said at least two baskets, a method for managing futures contracts that are based on baskets of credit default swaps as underlyings, the method comprising:

receiving, using a command input unit device, a parallelization command indicating at least one credit default swap from a first basket identified by data stored in said data storage, said at least one credit default swap being a credit default swap not having suffered a credit event;

generating, using a data generator configured to generate, in response to a received parallelization command, data identifying a second basket of credit default swaps having all credit default swaps of the first basket except for said at least one credit default swap;

storing the generated data in said data storage; and repetitively updating values, using a processor, for credit default swaps of said second basket while continuing storing repetitively updated values for credit default swaps of said first basket.

10. The method of claim 9, further comprising:

calculating, for each basket of credit default swaps for which the data storage stores repetitively updated values, a futures contract value in accordance with one of several calculation algorithms, said futures contract value being a value of a futures contract having the respective basket of credit default swaps as underlying, wherein the futures contract value for the futures contract of said first basket is calculated in the same manner after generation of the data identifying the second basket than before.

11. The method of claim 10, wherein the futures contract value for the futures contract of said second basket is calculated in accordance with a different calculation algorithm than the futures contract value for the futures contract of said first basket.

12. The method of claim 11, wherein the futures contract value is calculated, in accordance with each of said several calculation algorithms, based on a premium pertaining to the respective basket of credit default swaps, wherein the different calculation algorithm used to calculate the futures contract value for the futures contract of said second basket makes use of a premium which is reduced with respect to the premium in the calculation algorithm for the futures contract value for the futures contract of the first basket by a premium portion pertaining to said at least one credit default swap.

13. The method of claim 9, further comprising:

calculating, for each basket of credit default swaps for which the data storage stores repetitively updated values, a futures contract value in accordance with one of several different calculation algorithms, wherein, after a credit default swap in said first basket has suffered a credit event, the futures contract value for the futures contract of said first basket is calculated in a different manner than before.

14. The method of claim 13, wherein, after a credit default swap in said first basket has suffered a credit event and this credit default swap is a credit default swap for which a parallelization command was received that has caused generation of data identifying said second basket, the futures contract value for the futures contract of said first basket is calculated in a different manner than the futures contract value for the futures contract of said second basket.

15. The method of claim 14, wherein the futures contract value is calculated, in accordance with at least some of said several calculation algorithms, based on a premium pertaining to the respective basket of credit default swaps, wherein the one of several calculation algorithm used to calculate the futures contract value for the futures contract of said first basket makes use, after a parallelization command is received and before a credit default swap indicated by this parallelization command has suffered a credit event, of a premium, and wherein the calculation algorithm used to calculate the futures contract value for the futures contract of said first basket does not make use, after the credit default swap indicated by the parallelization command has suffered a credit event, of the premium.

16. The method of claim 9, wherein the parallelization command is received from an automated failure event anticipator which issues a parallelization command based upon information about an imminent credit event for a credit default swap in said first basket.

17. A computer readable storage medium storing instructions that, when executed by a processor in a data processing system having a data storage storing data identifying each credit default swap of at least two baskets of credit default swaps and storing repetitively updated values for credit default swaps of said at least two baskets, cause said processor to manage futures contracts that are based on baskets of credit default swaps as underlyings by performing the acts of:

receiving a parallelization command indicating at least one credit default swap from a first basket identified by data stored in said data storage, said at least one credit default swap being a credit default swap not having suffered a credit event;

generating, in response to a received parallelization command, data identifying a second basket of credit default swaps having all credit default swaps of the first basket except for said at least one credit default swap;

storing the generated data in said data storage; and repetitively updating values for credit default swaps of said second basket while continuing storing repetitively updated values for credit default swaps of said first basket.

18. The computer readable storage medium of claim 17, including instructions for receiving the parallelization command from an automated failure event anticipator which issues a parallelization command based upon information about an imminent credit event for a credit default swap in said first basket.

19. A data processing system for managing bundles of constructs that may individually fail, comprising:

a data storage for storing data identifying each construct of at least two bundles of constructs, and storing repetitively updated values for constructs of said at least two bundles;

command input means for receiving a parallelization command indicating at least one construct from a first bundle identified by data stored in said data storage, said at least one construct being a construct not having failed; and a data generator for generating, in response to a received parallelization command, data identifying a second bundle of constructs having all constructs of the first bundle except for said at least one construct, and storing the generated data in said data storage, wherein said data storage is configured to store repetitively updated values for constructs of said second bundle and continue storing repetitively updated values for constructs of said first bundle.

20. The data processing system of claim 19, further comprising:

a calculation unit for calculating, for each bundle of constructs for which the data storage stores repetitively updated values, a numeric value in accordance with one of several calculation algorithms, wherein said calculation unit is configured to calculate the numeric value of said first bundle in the same manner after generation of the data identifying the second bundle than before.

21. The data processing system of claim 20, wherein said calculation unit is further configured to calculate the numeric value of said second bundle in accordance with a different calculation algorithm than the numeric value of said first bundle.

22. The data processing system of claim 21, wherein the calculation unit is configured to calculate the numeric value, in accordance with each of said several calculation algorithms, based on a premium value being a repetitively updated resource amount usable for counterbalancing a transfer of a failure risk pertaining to the respective bundle of constructs, wherein the different calculation algorithm used to calculate the numeric value of said second bundle makes use of a premium value which is reduced with respect to the premium value in the different calculation algorithm for the numeric value of the first bundle by a resource amount counterbalancing a transfer of a failure risk pertaining to said at least one construct.

23. The data processing system of claim 19, further comprising:

a calculation unit for calculating, for each bundle of constructs for which the data storage stores repetitively updated values, a numeric value in accordance with one of several calculation algorithms, wherein said calculation unit is configured to calculate, after a construct in said first bundle has failed, the numeric value of said first bundle in a different manner than before.

24. The data processing system of claim 23, wherein said calculation unit is configured to calculate, after a construct in said first bundle has failed and this construct is a construct for which a parallelization command was received that has caused generation of data identifying said second bundle, the numeric value of said first bundle in a different manner than the numeric value of said second bundle.

25. The data processing system of claim 24, wherein the calculation unit is capable of calculating the numeric value, in accordance with at least some of said several calculation algorithms, based on a premium value being a repetitively updated resource amount usable for counterbalancing a transfer of a failure risk pertaining to the respective bundle of constructs, wherein the one of several calculation algorithm used to calculate the numeric value of said first bundle makes use, after a parallelization command is received and before the construct indicated by the parallelization command has failed, of a premium value, and wherein the one of several calculation algorithm used to calculate the numeric value of said first bundle does not make use of the premium value, after the construct indicated by the parallelization command has failed.

26. The data processing system of claim 19, wherein said bundles of constructs are baskets of credit default swaps.

27. The data processing system of claim 19, further comprising an automated failure event anticipator which issues a parallelization command based upon information about an imminent failure for a construct in said first bundle.

28. A data processing method for managing bundles of constructs that may individually fail, in a computer system having a data storage for storing data identifying each construct of at least two bundles of constructs and storing repetitively updated values for constructs of said at least two bundles, the method comprising:

receiving, using a command input unit device, a parallelization command indicating at least one construct from a first bundle identified by data stored in said data storage, said at least one construct being a construct not having failed;

generating, using a data generator configured to generate, in response to the parallelization command, data identifying a second bundle of constructs having all constructs of the first bundle except for said at least one construct;

storing the generated data in said data storage; and repetitively updating values, using a processor, in said data storage for constructs of said second bundle while continuing repetitively updating values for constructs of said first bundle.

29. The data processing method of claim 28, further comprising:

calculating, for each bundle of constructs for which the data storage stores repetitively updated values, a numeric value in accordance with one of several calculation algorithms, wherein the numeric value of said first bundle is calculated in accordance with one of several calculation algorithms after generation of the data identifying the second bundle than before.

30. The data processing method of claim 29, wherein the numeric value of said second bundle is calculated in accordance with a different calculation algorithm than the numeric value of said first bundle.

31. The data processing method of claim 30, wherein, in at least some of said several calculation algorithms, the numeric value is calculated based on a premium value being a repetitively updated resource amount usable for counterbalancing a transfer of a failure risk pertaining to the one of at least two bundles of contructs, wherein the calculation algorithm used to calculate the numeric value of said first bundle makes use, after a parallelization command was received and before the construct indicated by the parallelization command has failed, of a premium value, and wherein the different calculation algorithm used to calculate the numeric value of said first bundle does not make use of the premium value, after the construct indicated by the parallelization command has failed.

32. The data processing method of claim 28, further comprising:

calculating, for each bundle of constructs for which the data storage stores repetitively updated values, a numeric value in accordance with one of several calculation algorithms, wherein, after a construct in said first bundle has failed, the numeric value of said first bundle is calculated in a different manner than before.

33. The data processing method of claim 32, wherein, after a construct in said first bundle has failed and this construct is a construct for which a parallelization command was received that has caused generation of data identifying said second bundle, the numeric value of said first bundle is calculated in a different manner than the numeric value of said second bundle.

34. The data processing method of claim 33, wherein, in each of said several calculation algorithms, the numeric value is calculated based on a premium value being a repetitively updated resource amount usable for counterbalancing a transfer of a failure risk pertaining to the respective bundle of constructs, wherein the several calculation algorithms used to calculate the numeric value of said first bundle makes use, after a construct in said first bundle has failed and this construct is a construct for which a parallelization command was received that has caused generation of data identifying said second bundle, of a premium value which is reduced with respect to the premium value in the calculation algorithm for the numeric value of the first bundle before the construct has failed, by an amount which is based on a nominal value.

35. The data processing method of claim 28, wherein said bundles of constructs are baskets of credit default swaps.

36. The method of claim 28, wherein the parallelization command is received from an automated failure event anticipator which issues a parallelization command based upon information about an imminent credit event for a construct in said first bundle.

37. A computer readable storage medium string instructions that, when executed by a processor in a data processing system for managing bundles of constructs that may individually fail, in a computer system having a data storage for storing data identifying each construct of at least two bundles of constructs and storing repetitively updated values for constructs of said at least two bundles, the instructions perform a method comprising:

instructions for receiving a parallelization command indicating at least one construct from a first bundle identified by data stored in said data storage, said at least one construct being a construct not having failed;

instructions for generating, in response to the parallelization command, data identifying a second bundle of constructs having all constructs of the first bundle except for said at least one construct;

instructions for storing the generated data in said data storage; and instructions for repetitively updating values in said data storage for constructs of said second bundle while continuing repetitively updating values for constructs of said first bundle.

38. The computer readable storage medium of claim 37 including instructions for receiving the parallelization command from an automated failure event anticipator which issues a parallelization command based upon information about an imminent failure event for a construct in said first bundle.

* * * * *

UNITED STATES PATENT AND TRADEMARK OFFICE
CERTIFICATE OF CORRECTION

PATENT NO. : 7,603,310 B2 Page 1 of 1
APPLICATION NO. : 11/432756
DATED : October 13, 2009
INVENTOR(S) : Dinc et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 429 days.

Signed and Sealed this

Fifth Day of October, 2010

David J. Kappos
*Director of the United States Patent and Trademark Office*